United States Patent
McClure

(10) Patent No.: US 7,006,129 B1
(45) Date of Patent: Feb. 28, 2006

(54) REAR-VIEW DISPLAY SYSTEM FOR VEHICLE WITH OBSTRUCTED REAR VIEW

(76) Inventor: Daniel R. McClure, 3310 Cranmore Chase, Marietta, GA (US) 30066

( * ) Notice: Subject to any disclaimer, the term of this patent is extended or adjusted under 35 U.S.C. 154(b) by 704 days.

(21) Appl. No.: 10/021,226

(22) Filed: Dec. 12, 2001

(51) Int. Cl.
  *H04N 7/18* (2006.01)
(52) U.S. Cl. .................................. 348/148; 348/143
(58) Field of Classification Search ............... 348/148, 348/143, 66, 211.9, 211.1, 211.2, 211.8, 211.99; 340/461, 814.4
  See application file for complete search history.

(56) References Cited

U.S. PATENT DOCUMENTS

| | | | |
|---|---|---|---|
| 4,277,804 A | 7/1981 | Robinson | 358/108 |
| 5,016,098 A * | 5/1991 | Cooper et al. | 348/66 |
| 5,027,200 A | 6/1991 | Petrossian et al. | 358/103 |
| 5,289,321 A | 2/1994 | Secor | 358/896 |
| 5,530,421 A | 6/1996 | Marshall et al. | 340/436 |
| 5,642,238 A | 6/1997 | Sala | 359/871 |
| 5,719,713 A | 2/1998 | Brown | 359/843 |
| 5,765,116 A | 6/1998 | Wilson-Jones et al. | 701/41 |
| 5,788,357 A | 8/1998 | Muth et al. | 362/83.1 |
| 5,793,308 A | 8/1998 | Rosinski et al. | 340/903 |
| 5,838,368 A * | 11/1998 | Masunaga et al. | 348/211.9 |
| 5,917,666 A | 6/1999 | Kimble | 359/838 |
| 5,953,168 A | 9/1999 | Valentino | 359/843 |
| 6,217,177 B1 | 4/2001 | Rost | 359/843 |
| 6,218,960 B1 | 4/2001 | Ishikawa et al. | 340/901 |
| 6,250,766 B1 | 6/2001 | Strumolo et al. | 359/857 |
| 6,302,547 B1 | 10/2001 | Valentino | 359/843 |
| 6,304,173 B1 * | 10/2001 | Pala et al. | 340/461 |
| 6,315,420 B1 | 11/2001 | Standen et al. | 359/871 |
| 2002/0075159 A1 * | 6/2002 | DeLine et al. | 340/815.4 |

* cited by examiner

*Primary Examiner*—Allen Wong

(57) ABSTRACT

The present invention is generally directed to a a rear-view display system for a vehicle comprising a camera that is disposed near the rear of the vehicle and being generally rearwardly directed. The invention also includes a display that is in the general form and location of a conventional center-mounted rear-view mirror. Namely, the display is located near the top center portion of the windshield of the vehicle. In accordance with the invention, the video image that is captured (e.g., the scene to the rear of the vehicle) is displayed upon the display. By using the invention, a driver is able to view the area behind the vehicle as if the driver were looking into a conventional rear-view mirror.

17 Claims, 10 Drawing Sheets

REAR-VIEW DISPLAY SYSTEM FOR VEHICLE WITH OBSTRUCTED REAR VIEW

BACKGROUND OF THE INVENTION

1. Field of the Invention

The present invention generally relates to automotive rear-view display systems, and more particularly to a rear-view display system for vehicles with an obstructed rear view.

2. Discussion of the Related Art

As is well known, tractor-trailer vehicles are used to transport a wide variety of items from destination to destination. Tractor-trailer vehicles comprise a cabin (i.e., the "tractor" portion) and a trailer. The trailer is generally coupled to the cabin through a hitching mechanism that allows a relative pivotal movement between the tractor portion and the trailer. The trailer generally defines a large cargo area between four upstanding walls. Access to the cargo area is usually provided by doors that open at the rear of the trailer and/or from a side of the trailer.

As is also known, the upstanding walls that define the cargo area of the trailer are solid (or opaque), such that a direct, line-of-sight, center rear-view is not possible from the cabin area of the tractor-trailer vehicle. Instead, side-mounted rear-view mirrors are provided on both sides of the cabin, so that a driver of the vehicle may observe the area to the rear of the vehicle through these side-mounted rear-view mirrors. In this regard, reference is made to FIGS. 1A and 1B, which show a side view and a top view, respectively, of a conventional tractor-trailer vehicle 10. Note, however, that FIG. 1B is not the side view of the same truck illustrated in FIG. 1A). As previously mentioned, such a vehicle 10 comprises a cabin portion 12 and a trailer portion 14. Side-mounted rear-view mirrors 16 and 18 are provided to allow the driver 17 to view the areas to the side and rear of the vehicle 10.

The areas denoted by angles $\alpha$ and $\beta$ denote the field of view that the driver 17 is able to observe through the use of conventional side-mounted rear-view mirrors 16 and 18. However, and as is known, a relatively large blind-spot exists at the rear of the vehicle. This blind-spot is illustrated by the cross hatched (or shaded) area. If another vehicle, such as a car 22, is near the rear of the vehicle 10, such that the car 22 is entirely within the blind-spot of the vehicle 10, then the driver 17 of the vehicle 10 will be unable to see the automobile 22. This creates an obvious dangerous situation. Indeed, the danger created by this situation is so well known that many tractor-trailer vehicles include appropriate warning signs on the rear wall of the trailer. Such warning signs often include phrases like "If you can't see my mirrors, then I can't see you."

FIG. 1B illustrates the blind-spot that is created to the immediate rear of a vehicle 10, when the cabin 12 and trailer 14 are aligned (i.e., the vehicle 10 is traveling straight down the road). Although not specifically illustrated, it is understood that, when turning, the cabin 12 is disposed at an angle to the trailer 14, which results in the blind spot being shifted to the left or to the right, depending upon the direction of the turn. For example, when the vehicle 10 is turning right, and the cabin portion 12 is angled to the right, then the blind-spot at the rear of the vehicle 10 is moved to the left.

Accordingly, there is a clearly identifiable need to provide improved rear-view visibility for tractor-trailers. Indeed, a similar need exists for other types of vehicles as well. Specifically, in vehicles such as buses, cargo vans, passenger vans, and other vehicles having an obstructed rear-view, there is a clearly-identifiable need to provide a system that improves the visibility to the driver, and therefore greatly enhances the safety of the vehicle.

Accordingly, there is a need for an improved display systems for vehicles, like tractor trailers, which have an obstructed rear view.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a rear-view display system for a vehicle comprising a camera that is disposed near the rear of the vehicle and being generally rearward directed. The invention also includes a display that is in the general form and location of a conventional center-mounted rear-view mirror. Namely, the display is located near the top center portion of the windshield of the vehicle. In accordance with the invention, the video image that is captured (e.g., the scene to the rear of the vehicle) is displayed upon the display. By using the invention, a driver is able to view the area behind the vehicle as if the driver were looking into a conventional rear-view mirror.

The advantages of the present invention are clear. Most individuals who drive vehicles (such as tractor-trailers) having an obstructed rear-view also frequently drive cars or other vehicles having conventional center-mounted rear-view mirrors. It becomes habit or second nature to individuals to glance at the rear-view mirror in order to observe the area to the rear of the vehicle. By providing a video display in place of a conventional rear-view mirror, individuals may view the area to the rear of the vehicle by glancing at the display, just as if they were looking into a rear-view mirror.

In accordance with one embodiment of the present invention, a servo system is coupled to the camera, such that the direction of the camera may be movably controlled by the servo system. Preferably, the servo system includes two motors, such that one motor can controllably vary the direction or angle of the camera in a horizontal direction (i.e., providing a horizontal sweep of the area behind the vehicle) while the second motor controllable varies the angle of the camera at a vertical direction. In this embodiment, at least one position sensor is coupled to the display, such that the angle or direction of the camera is controlled by movement of the display. This allows the driver to control the direction of the camera by adjusting the position of the display, just as if the driver were adjusting the position of a rear-view mirror. In this regard, the direction of the camera is preferably controlled to point in the same direction as the display. As used herein, the direction of the display shall generally mean the direction perpendicular to the plane defined by the face of the display. In this regard, the preferred embodiment will have a generally planer display face, just like the planer surface of a conventional rear-view mirror.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENT

Figure 1A:
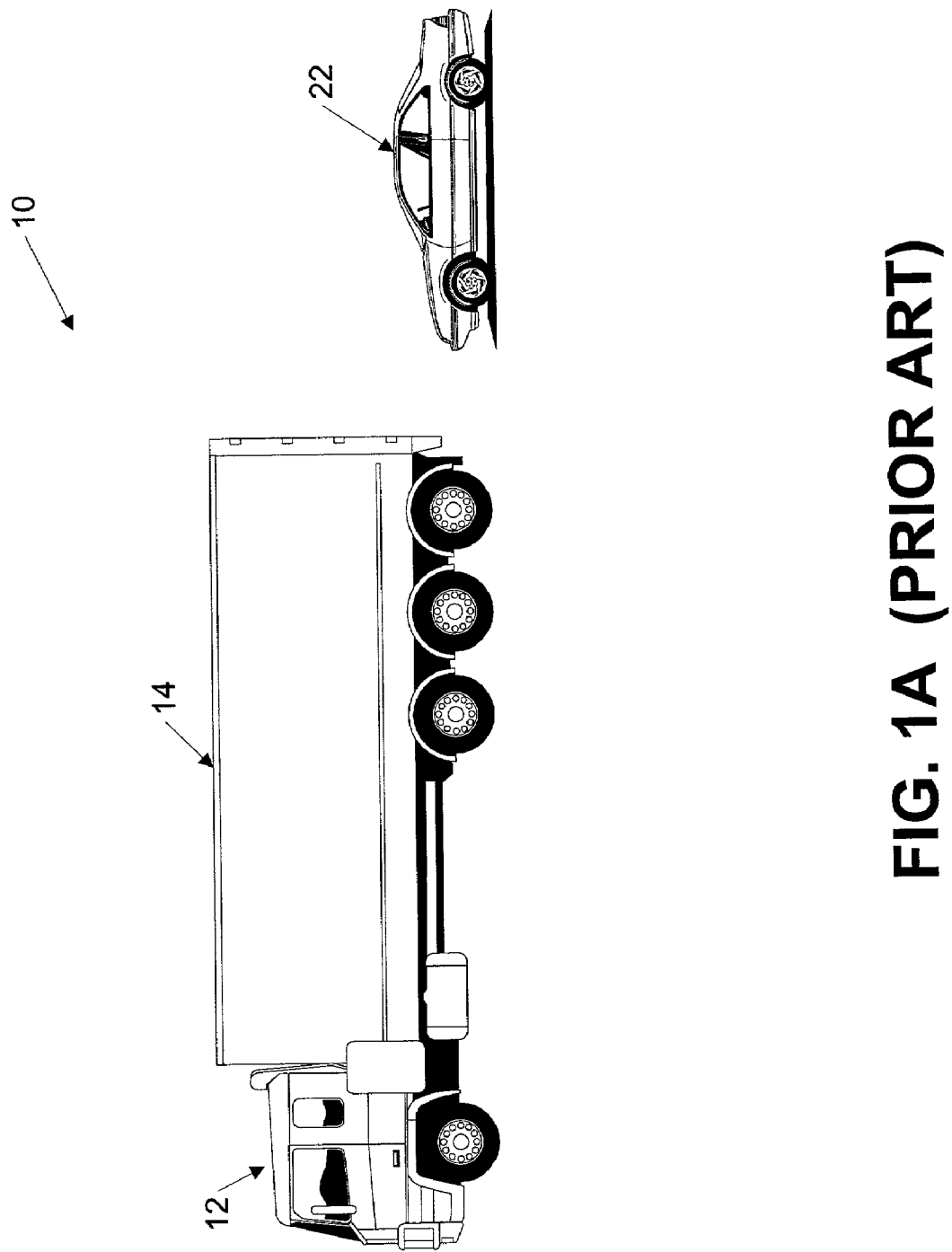
FIG. 1 is a side view of a conventional tractor-trailer vehicle.
FIG. 1B is a top-view of the tractor-trailer vehicle of FIG. 1A, illustrating the field of view of a driver using conventional side-mounted rear-view mirrors.
Figure 1B:
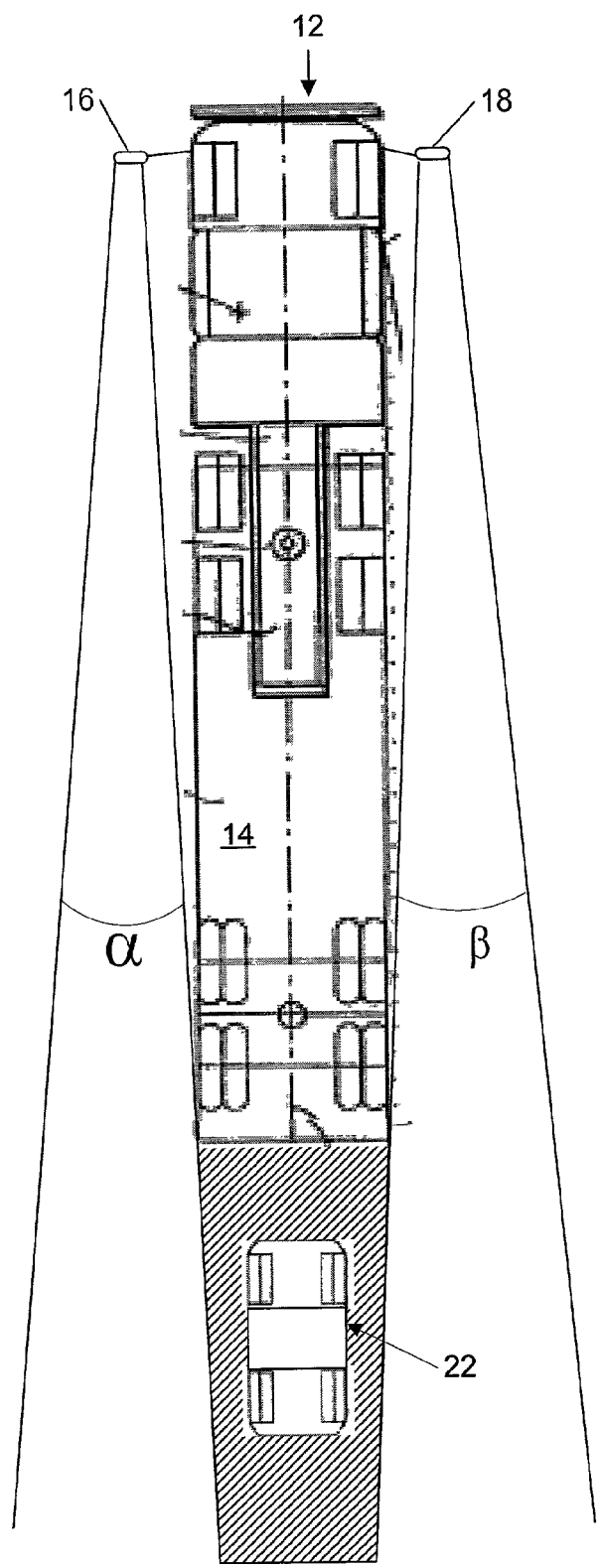

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2A:
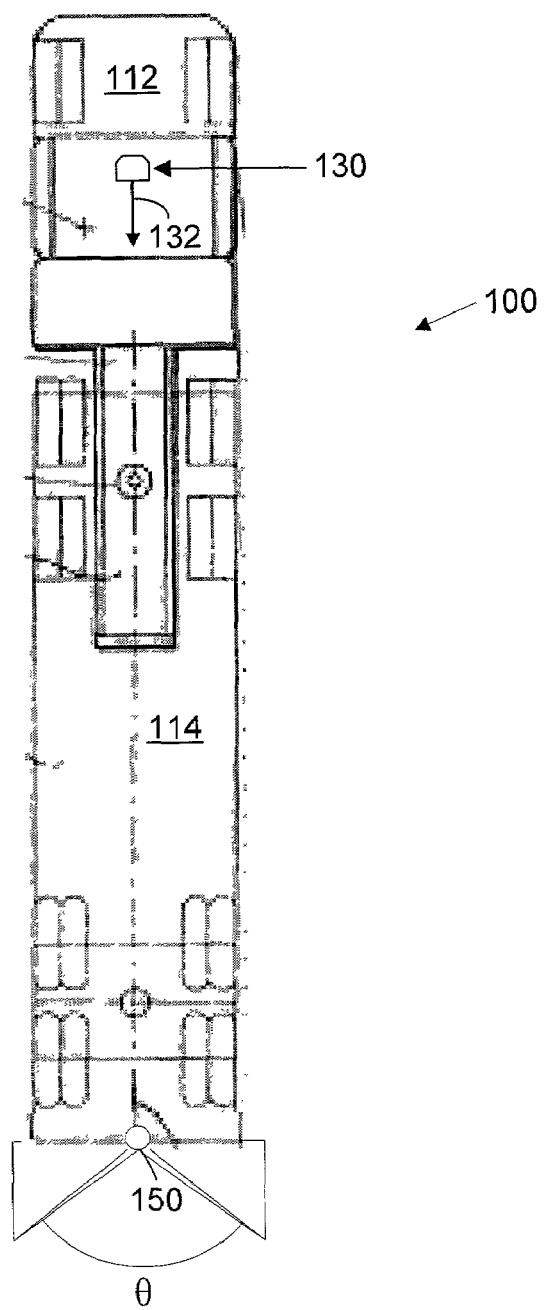
FIG. 2A is a top-view of a tractor-trailer vehicle, illustrating the field of view by a rear-mounted camera directed generally behind the vehicle.
Figure 2B:
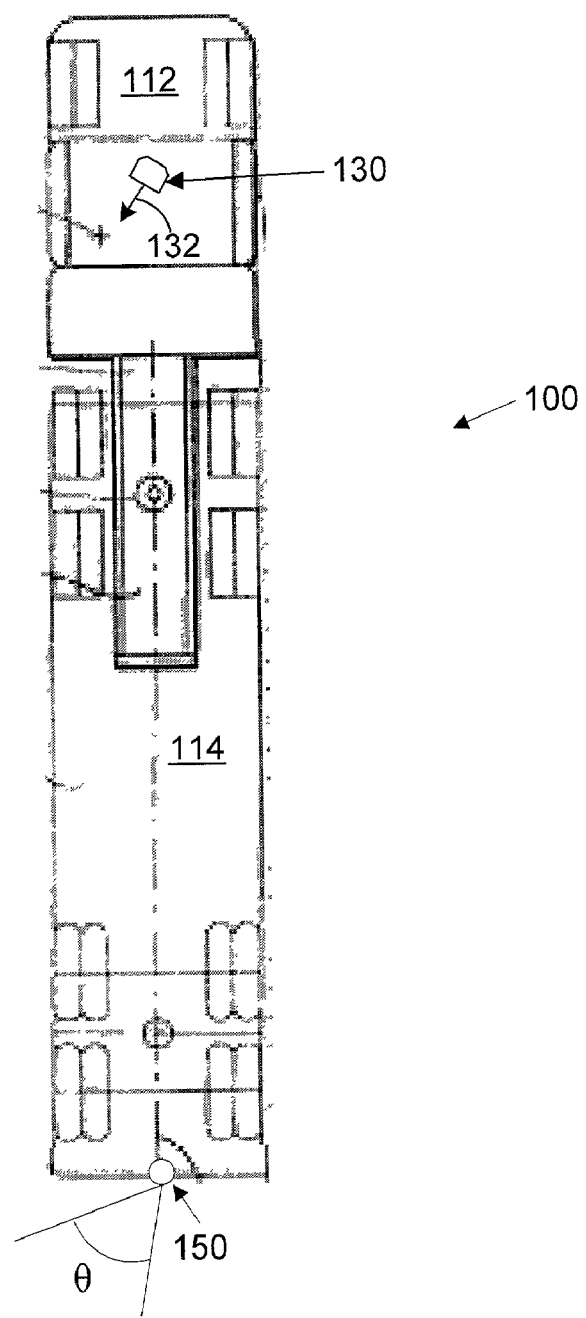
FIG. 2B is a top-view of a tractor-trailer vehicle, illustrating the field of view by a rear-mounted camera, as the camera is angled to the left.
Figure 2C:
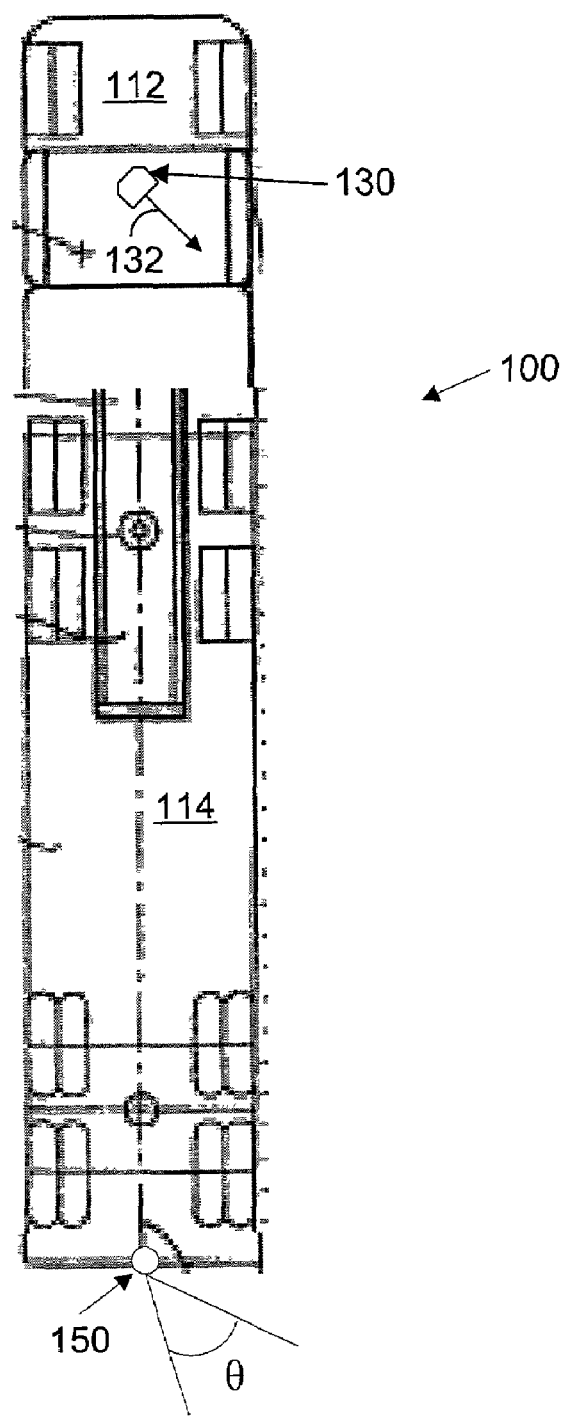
FIG. 2C is a top-view of a tractor-trailer vehicle, illustrated the field of view provided by a rear-mounted camera, as the camera is angled to the right.

Reference is now made to FIGS. 2A, 2B, and 2C, which are top views of a tractor-trailer vehicle 100 constructed in accordance with one embodiment of the present invention. Collectively, these three FIGS. illustrate the sweeping motion of a rear-mounted camera 150 (preferably a video camera) and the varying field of view that the movable camera 150 may provide in a horizontal direction. More specifically, and as described above, a tractor-trailer vehicle 100 includes a cabin portion 112 and a trailer portion 114. Side-mounted rear-view mirrors 116 and 118 may also be provided. In addition, a display 130 is provided. The display 130 is preferably provided in the form of a conventional center-mounted rear-view mirror. In this regard, it is preferred that the display essentially emulate a convention center-mounted rear-view mirror, giving the driver the look and feel (and operation) of a conventional rear-view mirror. Consistent with this broad objective, it will be appreciated that the display 130 may take on a variety of forms. Indeed, the display may be a LCD display, a flat-panel display, a plasma display, a CRT, or a variety of other display technologies, which are well known by persons skilled in the art, and therefore need not be described herein. An arrow 132 is provided to illustrate the direction in which the display 130 is pointing. As mentioned above, the direction 132 of the display is defined as the direction along an axis generally perpendicular to the face or plane of the display, and directed rearwardly (i.e., toward the rear of the vehicle).

As will be described in more detail below, one embodiment of the present invention couples position sensors associated with the display 130 with a servo system associated with the camera 150, such that the direction of the display 130 is used to control the direction of the camera 150. As illustrated in FIG. 2A, the display 130 is directed substantially rearwardly. Accordingly, the horizontal direction of the camera (or camera lens) 150 is directed substantially rearwardly. The angle θ is used to illustrate the field of view of the camera 150. Consistent with the scope and spirit of the present invention, the camera 150 is not limited to any particular angle or field of view, but rather differing lens magnitude or magnification may be provided consistent with the invention. Indeed, and as will be discussed further below, one embodiment of the present invention utilizes a zoom lens, such that the field of view or magnification of the lens may be dynamically varied.

FIG. 2B is a top-view of a tractor-trailer vehicle illustrating the horizontal movement of the display 130 in a leftward direction, as denoted by direction arrow 132. As a result, the servo system, which will be described further below, controllably directs or angles the camera 150 in a horizontal fashion to the left. Likewise, FIG. 2C is a top-view of a tractor-trailer vehicle 100 illustrating the display 130 being angled in a horizontal direction to the right. Correspondingly, the servo system that is coupled to the camera 150 controls the camera direction such that the field of view is swept horizontally to the right.

Figure 3A:
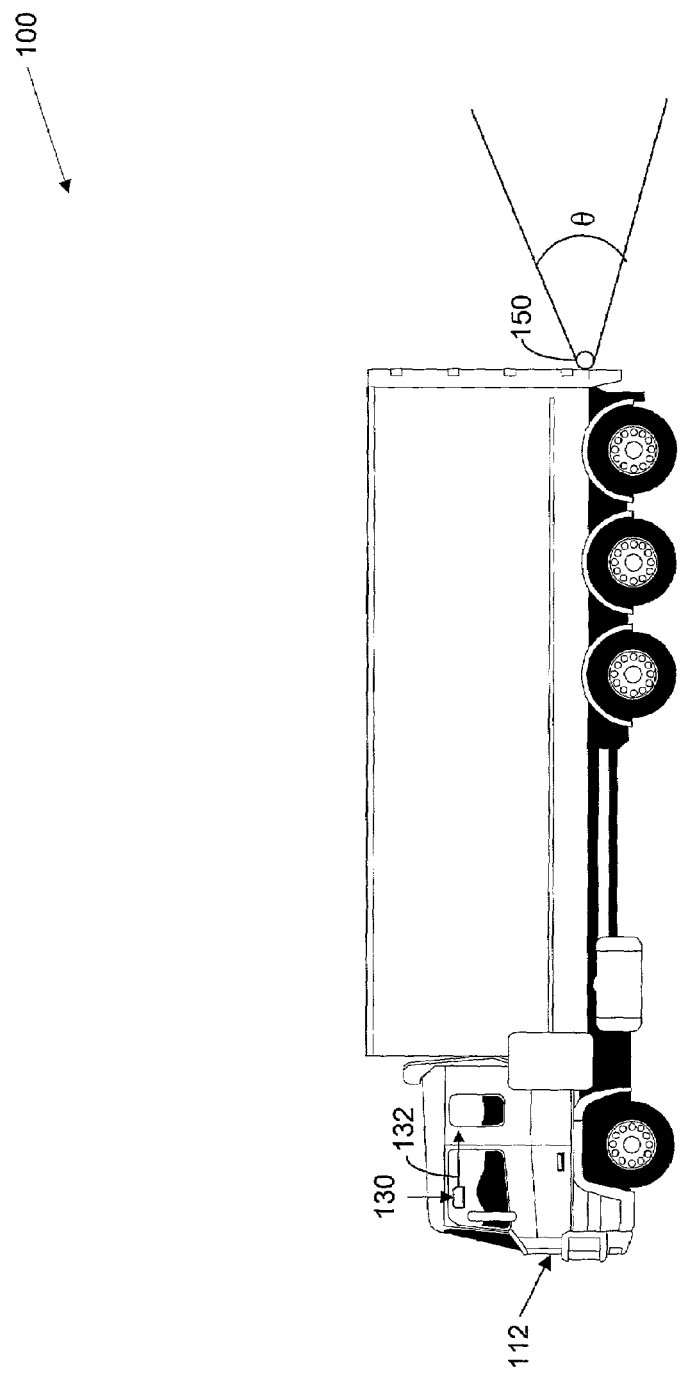
FIG. 3A is a side view of a tractor-trailer vehicle, illustrating the field of view provided by a rear-mounted camera directed generally horizontal to the vehicle.
Figure 3B:
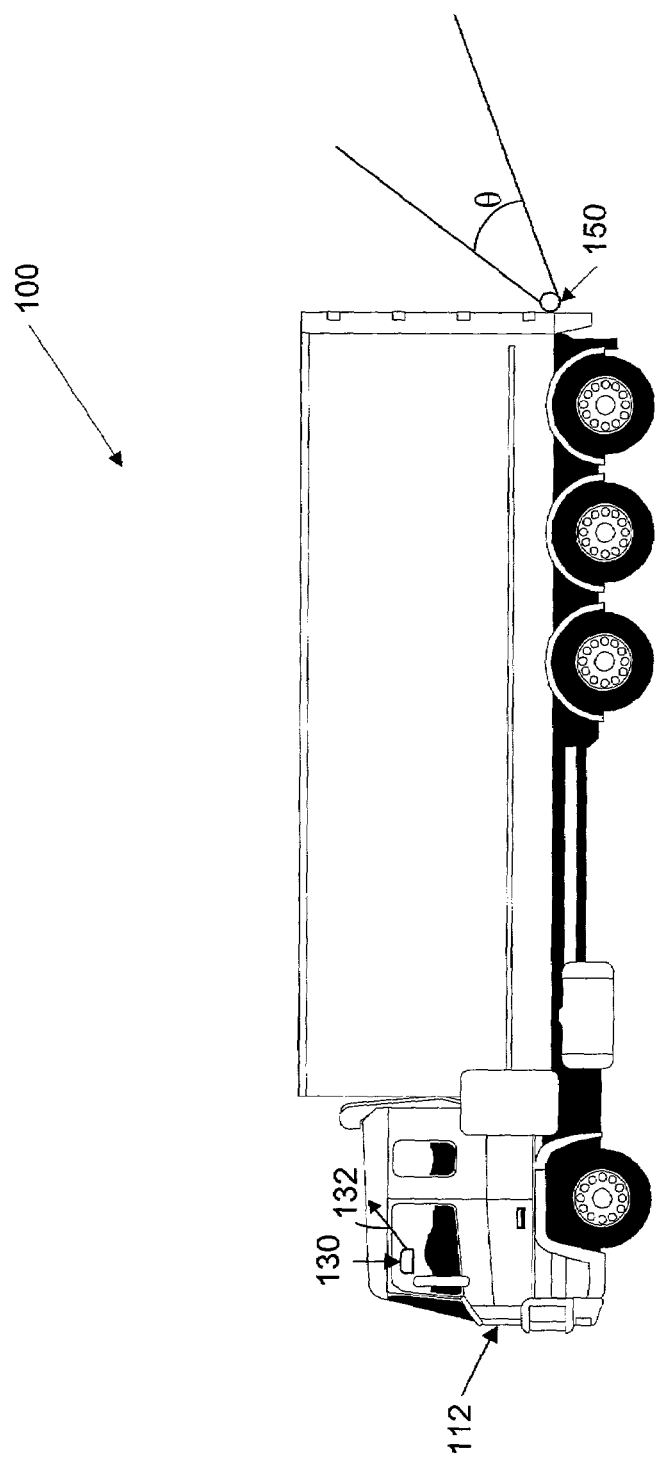
FIG. 3B is a side view of a tractor-trailer vehicle, illustrating the field of view provided by a rear-mounted camera, as the camera is angled upwardly.
Figure 3C:
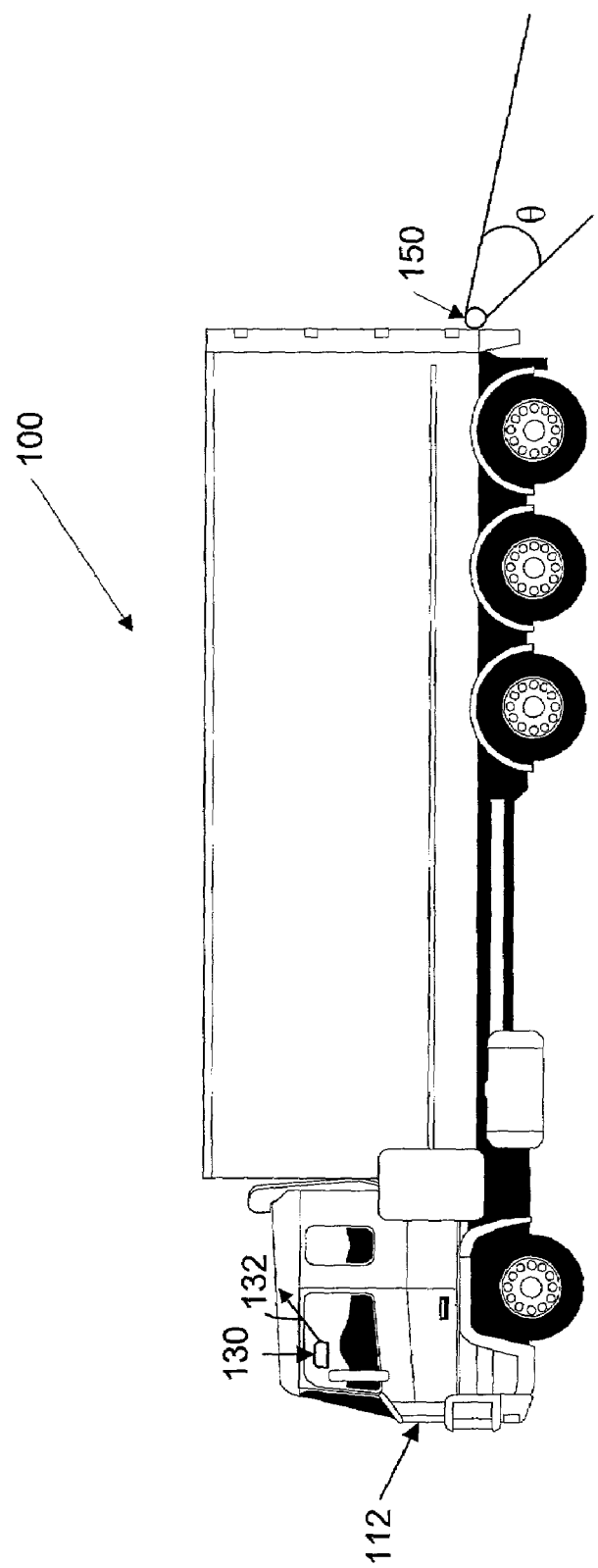
FIG. 3C is a side view of a tractor-trailer vehicle, illustrating the field of view provided by a rear-mounted camera, as the camera is angled downwardly.

Reference is now made to FIGS. 3A, 3B, and 3C, which are side views of a tractor-trailer vehicle 100, which illustrate the directional coupling of the display 130 with the camera 150 in a vertical direction or dimension. In this regard, FIG. 3A illustrates the display 130 being vertically directed in a generally horizontal direction, as denoted by direction line 132. Accordingly, the camera is generally disposed in a horizontal direction to capture a field of view directly behind the vehicle. As illustrated in FIG. 3B, however, as the display 130 is angled vertically upward (as denoted by direction line 132), the servo system angles the camera 150 in an upward direction. Similarly, and as illustrated in FIG. 3C, as the display 130 is angled downwardly, the servo system angles the camera 150 in a correspondingly downward direction.

In the preferred embodiment, the servo system controls the angle or the direction of the camera 150 such that the direction of the camera 150 is substantially co-aligned with the direction 132 of the display 130. Advantageously, this provides the driver of the vehicle with a "look and feel" of the display that is consistent with the "look and feel" of a conventional rear-view mirror. In this regard, when a driver, using a conventional rear-view mirror, wants to view an area to the left of the area presently displayed in the rear-view mirror, the driver simply adjusts or angles the rear-view mirror to the left. Using a system of the present invention, a driver can achieve the same result by adjusting or angling the display 130 to the left. To facilitate this maneuverability of the display 130, the display may be mounted to the vehicle like a conventional rear-view mirror.

In practice, however, the camera and display system of the present invention provide much improved visibility over that provided through a conventional rear-view mirror. Specifically, the present invention allows a driver to angle the mirror upwardly or downwardly. In conventional vehicles, the roof and floor of the vehicle obstruct these vertically sweeping fields of view. However, and as illustrated in FIGS. 3B and 3C, the camera/display system of the present invention allows a driver to obtain and display these views unobstructedly. This is particularly advantageous when the driver is operating the vehicle in reverse, as the camera will provide drastically improved visibility for objects located to the immediate rear of the vehicle.

In accordance with another embodiment of the present invention, not specifically illustrated in the drawings, a similar system may be provided without the position sensors and servo mechanism. In such an embodiment, the camera 150 may be disposed at the rear of the vehicle and directed in a direction substantially rearward to the vehicle. In this embodiment, the direction of the camera is fixed, and does not change regardless of the position or direction of the display 130. The display 130, however, is provided in the general configuration and location of a conventional rear-view mirror.

Figure 4:
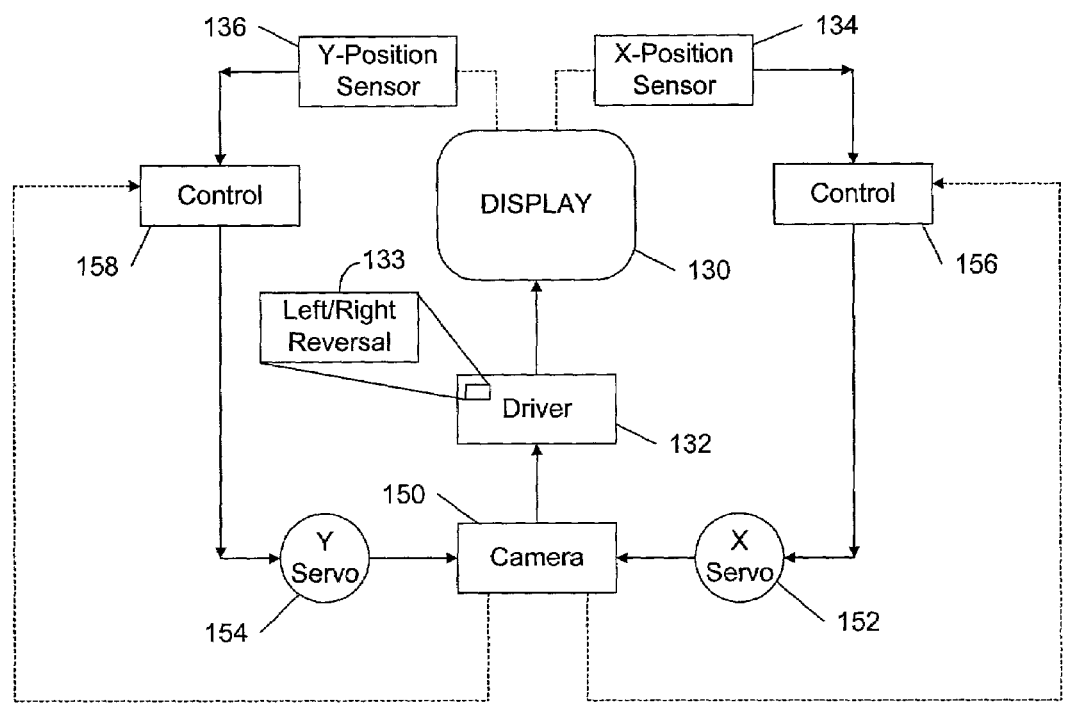
FIG. 4 is a block diagram illustrating certain principal components of one embodiment of the present invention.

Reference is now made to FIG. 4, which is a block diagram illustrating certain principal components of one embodiment of the present invention. As described above, the invention includes a camera 150 and display 130. In a manner that is well known, the camera generates an output video signal. The output signal is input to a driver circuit 132 that is used to drive the display 130. Of course, the output from the display driver 132 will necessarily depend upon the type of display 130 (e.g., LCD, CRT, plasma, etc.). In one embodiment, the driver circuitry 132 will include logic 133 to perform a left/right (i.e., horizontal) reversal of the image that is to be presented on the display 130. In this regard, it is well known that the image that is reflected from a conventional mirror effects a left/right reversal of the image that is reflected from the mirror. By performing a left/right reversal of the image captured by the video camera 150, the display 130 will present the image to the driver in a fashion that the driver is accustomed to seeing when viewing objects in a rear-view mirror.

The embodiment illustrated in FIG. 4 also includes at least one position sensor that is configured to sense both the horizontal and vertical dispositions or positions of the display 130. In the preferred embodiment, two such position sensors are provided. A first position sensor 134 is provided to sense the position or movement of the display 130 in the horizontal or X direction. A second sensor 136 is provided to sense the position or movement of the display 130 in the vertical or Y direction. These sensors may be implemented in a variety of ways, which are known and understood persons skilled in the art, and therefore need not be described herein. Indeed, position sensors such as these are used in a wide variety of devices, such as a conventional joystick for a personal computer.

As previously mentioned, a servo system is provided for controlling the direction of the camera 150. In the embodiment illustrated in FIG. 4, the servo system may be implemented through the use of two separate servo motors 152 and 154. A first servo motor may be configured to impart or control the disposition of the camera in the horizontal or X direction. A second servo motor 154 may be used to similarly impart or control the direction of the camera 150 in the vertical or Y direction. Control circuitry 156 and 158 is also provided to receive the output signals from the position sensors 134 and 136, and generate the necessary control signals for controlling the servo motors 152 and 154. As illustrated in dash lines, position information is fed back from the camera 150 so that the camera position control may be implemented in a closed-loop system. That is, position information of the camera is sensed and fed back to the control circuits 156 and 158, so that the respective control circuits can ensure that the camera is in the proper position as specified by the position sensors 134 and 136.

Figure 5:
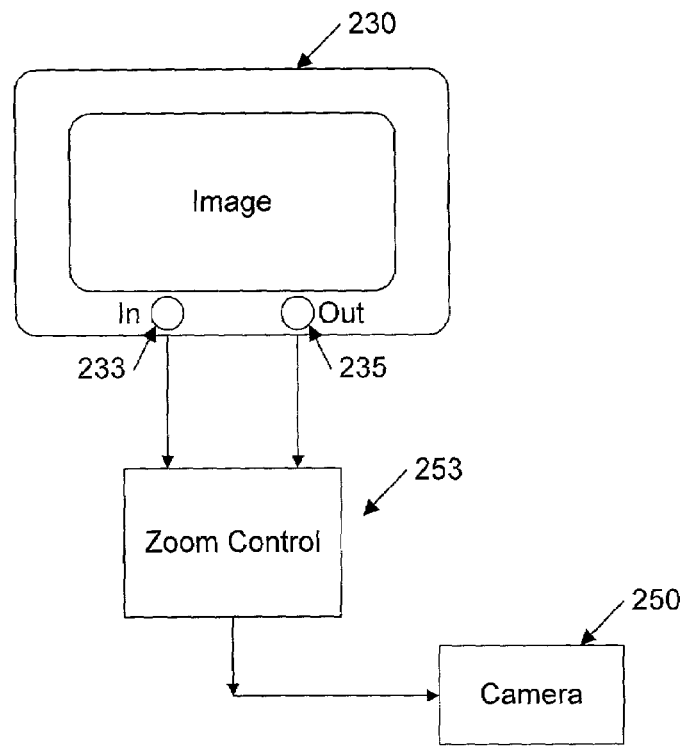
FIG. 5 is a block diagram illustrating certain principal components provided in an embodiment of the present invention, having a camera with a zoom lens.

Reference is now made to FIG. 5, which is a diagram illustrating certain features of one embodiment of the present invention. In this regard, in one embodiment of the invention, the camera 250 may include a zoom lens. Magnification of the zoom lens may be provided through controls provided in the passenger compartment of the vehicle. In a preferred embodiment, this magnification control is provided through the use of two buttons 233 and 235. A first button 233, when activated, increases the magnification of the zoom of the camera lens 250, while the second button 235, when activated, decreases the magnitude of the zoom of the lens of the camera 250. Thus, activating button 233 causes the camera to zoom in, while activating button 235 causes the camera to zoom out. As illustrated in FIG. 5, these buttons may be provided on the display 230 itself. Specifically, the buttons may be provided near a border of the display 230, while a center portion of the display 230 defines an active portion of the display for displaying the video image captured by the camera 250.

Also provided in this embodiment is circuitry 253 that provides control of the magnification or zoom of the camera 250. Of course, other components, such as those illustrated and discussed in connection with FIG. 4 may be provided in connection with the embodiment of FIG. 5 as well. However, these features have been omitted from FIG. 5 for simplicity. Further, it should be appreciated that the features of FIG. 5 may be implemented in an embodiment of the present invention, described above, in which the camera is mounted to the vehicle in a stationary or fixed position.

Figure 6:
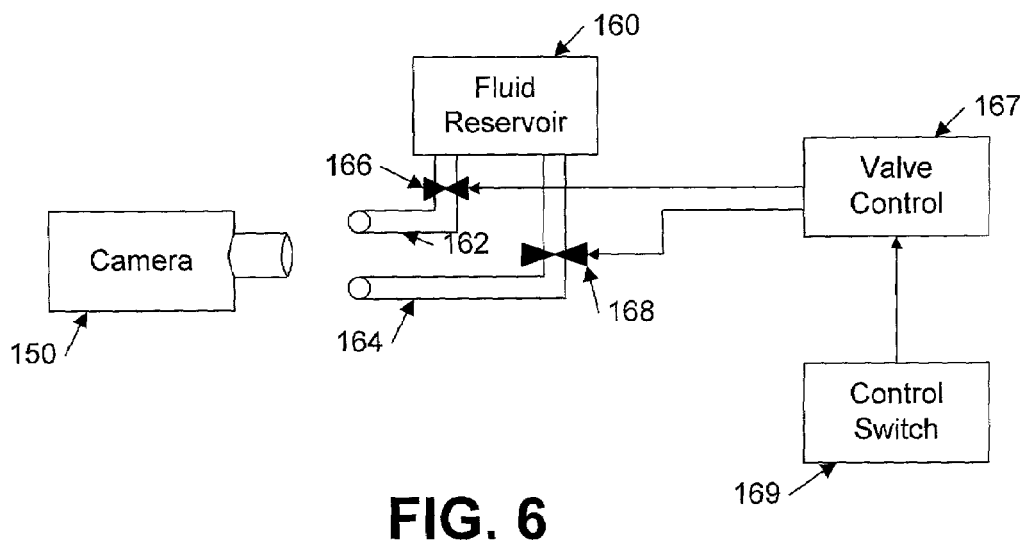
FIG. 6 is a block diagram illustrating certain principal components that provide a mechanism for automatically cleaning dirt or debris from the lens of a camera used in an embodiment of the invention.

Reference is now made to FIG. 6, which is a diagram illustrating certain features and elements of one embodiment of the present invention. It will be appreciated that when a camera 150 is mounted near the rear of a vehicle mud, dirt, dust, or other debris may get "kicked" up from the road and cover the lens, and therefore impair the visibility provided through the lens and thus on the display 130. Without some mechanism for clearing debris from the lens of the camera, such a system would require a driver to periodically stop the vehicle to clear debris from the camera lens. Accordingly, one embodiment of the present invention provides a mechanism for cleaning the camera lens. In essence, this feature can be implemented by mounting one or more fluid-ejecting nozzles in the vicinity of the camera lens, and generally directed towards the camera lens. Activating the system may cause fluid to be ejected from the nozzles onto the lens, thereby dislodging and flushing particles or other debris that have impaired the visibility of the lens. Of course, in such an embodiment, it will be appreciated that the camera would be manufactured to be resistant to water and other environmental elements.

Therefore, briefly described, the pertinent features of the embodiment illustrated in FIG. 6 include one more nozzles 162 and 164 that are disposed in fluid communication with a fluid reservoir 160. Preferably, the cleaning fluid would be water, but other ingredients such as detergent or other items that may promote or facilitate the cleaning action may be provided as well. Fluid lines (or communication channels) connect the fluid reservoir 160 to the nozzles 162 and 164. Valves 166 and 168 may be provided in the fluid communication channels and are controllable to open or close, thereby allowing fluid to be ejected from the nozzles 162 and 164 in a controlled fashion. In this regard, a block denoted as valve control 167 is provided and outputs the necessary control signals for operating the valves 166 and 168. A control switch 169 may be provided in the passenger compartment of the vehicle to activate the valve control, and therefore the fluid ejection action of the nozzles 162 and 164. It will be appreciated that a driver, by merely viewing the display 130 will be able to tell when sufficient debris has been cleared from the lens of the camera 150 to release the control switch 169, so that cleaning fluid is not used excessively.

It will be appreciated that what have been described above have been various embodiments of a novel viewing system that provide substantially enhanced and controlled viewing of a scene to the rear of a vehicle. In its preferred embodiments, the invention is ideally suited for vehicles, such as tractor-trailers, which have an inherent obstructed center rear view. However, the inventive system may be used on virtually any vehicle. As is known, at times, even automobiles are so loaded with cargo or passengers that the center rear-view (i.e., through the rear-view mirror) becomes obstructed and impaired. Further, video cameras are becoming increasingly compact in size and inexpensive in cost, thereby making the implementation of the present on a wide variety of vehicles commercially feasible.

Consistent with above-described features and embodiments of the invention, it will be appreciated that various other modifications and embodiments may be provided consistent with the scope and spirit of the present invention. Also, numerous implementation details may be included that have not be particularly described herein. For example, the camera and/or lens will preferably be configured to automatically and appropriately adjust for different lighting situations. For example, the camera will be configured to adjust to low lighting situations, so that a rear-view display may be provided even in low lighting situations, such as nighttime. At the same time, the camera will be appropriately equipped to adjust its lighting conditions such that an appropriate display may be provided even though another vehicle is close behind with headlights shining into the camera. Technology for this type of lighting adjustments is known, and therefore need not be described herein.

Further, and as alluded to above, the camera/display system of the present invention may even be used in automobiles for those times in which the automobile has an obstructed rear-view. In this regard, a separate display may be provided in close proximity to a conventional rear-view mirror. Alternatively, a specially-designed rear-view mirror may be provided having one portion that is a conventional reflective rear-view mirror portion, and having another portion that is configured to present an electronic display.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A rear-view display system for vehicle comprising:
    a camera disposed near a rear of the vehicle, the camera being generally rearward facing;
    a display in the general form of a rear-view mirror, the display being disposed near a top center portion of a windshield of the vehicle, the display being configured to display a video image acquired by the camera;
    at least one position sensor coupled to the display; and
    a servo system coupled to the camera, the servo system being configured to controllably direct the camera in both horizontal and vertical directions based upon information obtained from the at least one position sensor wherein the direction of the camera is controllably moved in both horizontal and vertical directions so that the visual image on the display is similar to that which would be seen in a conventional rear view mirror that is moved in the same position.

2. The rear-view display system of claim 1, wherein the servo system includes two motors, wherein a first motor controls movement of the direction of the camera in a first dimension, and a second motor controls movement of the direction of the camera in a second dimension.

3. The rear-view display system of claim 2, wherein the first dimension is a horizontal dimension and the second dimension is a vertical dimension.

4. The rear-view display system of claim 1, further including a controller configured to generate at least one control signal to control the servo system and thereby control the direction in which the camera points.

5. The rear-view display system of claim 4, wherein the controller is configured to point the camera in a direction that closely parallels the direction of the display, as determined by the at least one position sensor.

6. The rear-view display system of claim 1, wherein the camera includes a zoom lens.

7. The rear-view display system of claim 6, further including controls disposed within a passenger compartment of the vehicle to control the magnitude of zoom of the camera lens.

8. The rear-view display system of claim 7, wherein the controls include a first button that, when activated, increases the magnitude of the zoom, and a second button that, when activated, decreases the magnitude of the zoom.

9. The rear-view display system of claim 8, wherein the first and second buttons are disposed on the display.

10. The rear-view display system of claim 1, further including a fluid ejection mechanism configured to remove debris from the camera.

11. The rear-view display system of claim 10, wherein the fluid ejection mechanism includes a fluid reservoir for storing fluid for clearing debris from the camera.

12. The rear-view display system of claim 10, wherein the fluid ejection mechanism includes at least one fluid ejection nozzle disposed to, when activated, spray fluid onto the camera.

13. The rear-view display system of claim 10, wherein the fluid ejection mechanism includes at least one valve for selectively allowing fluid to pass from a fluid reservoir to at least one ejection nozzle, the fluid ejection mechanism further including a control mechanism disposed within a passenger compartment of the vehicle for controlling a state of the at least one control valve.

14. The rear-view display system of claim 1, wherein the display is one selected from the group consisting of a liquid crystal display (LCD), a flat-panel display, a cathode ray tube (CRT) display, and a plasma display.

15. A rear-view display system for a vehicle comprising:
a camera disposed near a rear of the vehicle, the camera being generally rearward facing; and
a display in the general form of a rear-view mirror, the display being disposed near a top center portion of a windshield of the vehicle, the display being configured to display an image acquired by the camera, wherein the direction of the camera is controlled by a motorized system such that the camera is controllably moved in both horizontal and vertical directions in response to horizontal and vertical movements of the display so that the visual image on the display is similar to that which would be seen in a conventional rear view mirror that is moved in the same position.

16. The rear-view display system of claim 15, further including:
at least one position sensor coupled to the display; and
a servo system coupled to the camera, the servo system being configured to controllably direct camera in both horizontal and vertical directions based upon information obtained from the at least one position sensor.

17. The rear-view display system of claim 15, wherein the vehicle is one selected from the group consisting of a tractor-trailer, a truck, a van, and a car.

* * * * *